United States Patent [19]

Gallo et al.

[11] E Patent Number: Re. 33,373

[45] Reissued Date of Patent: Oct. 9, 1990

[54] TOOLING APPARATUS FOR MODIFYING NUCLEAR REACTORS

[75] Inventors: Frank G. Gallo, Mt. Airy, Md.; Clark E. Swenson, Orchard Park, N.Y.; William A. Bencloski, Hermine, Pa.; Angelo J. Cassette, Greensburg, Pa.; John L. Mano, White Oak, Pa.; Edward A. Parlak, North Huntingdon, Pa.

[73] Assignee: Westinghouse Electric Corp., Pittsburgh, Pa.

[21] Appl. No.: 231,403

[22] Filed: Aug. 12, 1988

Related U.S. Patent Documents

Reissue of:

[64] Patent No.: 4,716,010
Issued: Dec. 29, 1987
Appl. No.: 561,018
Filed: Dec. 13, 1983

[51] Int. Cl.[5] ..... G21C 19/02

[52] U.S. Cl. ..... 376/260; 29/407; 29/525; 29/723; 29/906; 376/262; 376/263

[58] Field of Search ..... 29/400 N, 407, 525, 29/720, 723; 269/1, 2; 376/203, 204, 249, 260, 262, 263

[56] References Cited

U.S. PATENT DOCUMENTS

| | | | |
|---|---|---|---|
| 3,523,353 | 8/1970 | Drinkard et al. . | |
| 3,901,073 | 8/1975 | Dent et al. . | |
| 3,941,259 | 3/1976 | Hoffmeister et al. . | |
| 4,165,254 | 8/1979 | Reyes | 376/263 |
| 4,311,556 | 1/1982 | Iwamoto et al. . | |
| 4,347,652 | 9/1982 | Cooper, Jr. et al. . | |
| 4,393,899 | 7/1983 | Tsuji et al. . | |
| 4,421,715 | 12/1983 | Gunter et al. . | |
| 4,436,692 | 3/1984 | Stenabaugh . | |
| 4,436,694 | 3/1984 | Vassalotti et al. | |
| 4,470,946 | 9/1984 | Vassalotti et al. . | |
| 4,548,783 | 10/1985 | Dalke et al. . | |
| 4,591,068 | 5/1986 | Tolino et al. . | |
| 4,650,638 | 3/1987 | Coussau . | |
| 4,650,639 | 3/1987 | Coussau . | |

FOREIGN PATENT DOCUMENTS

| | | |
|---|---|---|
| 0071536 | 2/1983 | European Pat. Off. . |
| 0077245 | 4/1983 | European Pat. Off. . |
| 2913742 | 10/1980 | Fed. Rep. of Germany . |
| 3112201 | 10/1982 | Fed. Rep. of Germany . |
| 2541032 | 8/1984 | France . |

OTHER PUBLICATIONS

Dobbeni et al., Nuclear Engineering International, Jun. 1982, pp. 43–46.

*Primary Examiner*—Charles T. Jordan
*Assistant Examiner*—Richard W. Wendtland

[57] ABSTRACT

A remotely controlled tooling apparatus is disclosed for supporting and selectively disposing a tool with respect to a workpiece illustratively taking the form of a core barrel of a nuclear reactor. Illustratively, a core barrel is of a substantially cylindrical configuration and has a plurality of flow holes disposed therethrough. The remotely controlled apparatus comprises a tool carriage, a support table carried thereby for receiving the tool, a strongback assembly for supporting and guiding the tool carriage with respect to the core barrel, and a pair of clamps affixed to the strongback assembly for engaging the core barrel for suspending the strongback assembly upon the core barrel. The tool carriage and its support table carried thereby are selectively disposed with respect to the core barrel, whereby the tool may be engaged and disengaged with and from the core barrel. In an illustraitive embodiment of this invention, the tool takes the form of an arm for releasably holding a plug to the inserted into a selected one of the existing flow holes.

21 Claims, 11 Drawing Sheets

TOOLING APPARATUS FOR MODIFYING NUCLEAR REACTORS

Matter enclosed in heavy brackets [ ] appears in the original patent but forms no part of this reissue specification; matter printed in italics indicates the additions made by reissue.

BACKGROUND OF THE INVENTION

This invention relates to apparatus for modifying nuclear reactors and, more particularly, to an electromechanical apparatus for remotely locating, measuring and inserting plugs within coolant flow holes of a core barrel of a nuclear reactor.

A nuclear reactor 10, typical of the prior art, is shown in FIG. 1A as including a reactor vessel 16 into which is pumped a coolant fluid through an inlet 20 and, after cooling the reactor, to be discharged through an outlet 22. A core barrel 14 is disposed within the reactor vessel 16 and comprises a top former plate 12 and a baffle plate 32. As illustrated in FIG. 1A, the coolant flow is directed through an existing flow hole 26 downwardly along a path 34b and through an opening formed between the bottom of the baffle plate 32 and a lower core plate 18. A plurality of nuclear fuel rod assemblies 24, one of which is illustrated in FIG. 1A, is disposed within the core barrel 14. The coolant fluid is also directed downwardly along a path 34a and upwardly, as shown in FIG. 1A, through a plurality of openings 14a–14e formed within the bottom of the core barrel 14. Subsequently, the fluid directed into the core barrel 14 is directed upwardly through a plurality of openings 19a to 19d within a lower core plate 18 and, thereafter, directed about the plurality of nuclear fuel rod assemblies 24, thereby, removing heat therefrom.

In a nuclear reactor 10 of the downflow design, as shown in FIG. 1A, damage has been sustained to the fuel rods of the assemblies 24. Analysis indicates that the coolant flow, as directed along the path 34b and discharged through that opening formed between the baffle plate 32 and the lower core plate 18, impinges against and damages the fuel rods. To prevent nuclear fuel rod damage, it is proposed to convert a nuclear reactor from a downflow-type nuclear reactor 10, as illustrated in FIG. 1A, to an upflow-type reactor 10', as illustrated in FIG. 1B. Referring now to FIG. 1B, this conversion requires: (1) machining a plurality of new flow holes 28 within the top former plate 12, one such hole 28 being illustrated in FIG. 1B, and (2) plugging the existing flow holes 26 with plugs, one such plug 30 being illustrated in FIG. 1B. (Need a description of or reference to a description of the plugs 30?). The number of holes 26 and their location within the vertical wall of the core barrel 14 depends upon the particular type of nuclear reactor 10, i.e., whether the nuclear reactor 10 includes 2, 3 or 4 loops.

Referring now to FIG. 2, a core barrel 14 is illustrated as being submerged in canal water 40 filling a refueling canal 36 formed between canal walls 38a and 38b. The core barrel 14 includes a flange 66 disposed about its top-most edge. Due to the proximity of the core barrel flange 66 to the canal walls 38, the upflow conversion needs to be performed on the core barrel 14 while it is immersed within the refueling canal 36. As will be explained below, the apparatus of this invention serves to locate and measure the existing holes 26 within the core barrel 14, before inserting plugs 30 therein. It is imperative that these tasks be performed remotely in that there exists a high level of radiation adjacent to the core barrel 14 and the canal water 40.

SUMMARY OF THE INVENTION

The remotely controlled tooling apparatus of this invention provides a system for supporting and selectively disposing a tool with respect to a workpiece illustratively taking the form of a core barrel of a nuclear reactor. Illustratively, a core barrel is of a substantially cylindrical configuration and has a plurality of flow holes disposed therethrough. The remotely controlled apparatus comprises a tool carriage assembly for receiving the tool, a strongback assembly for supporting and guiding the tool carriage with respect to the core barrel, and a pair of clamps affixed to the strongback assembly for engaging the core barrel for suspending the strongback assembly along a first dimension substantially parallel to an axis of the core barrel. A first drive motor is mounted on the strongback assembly and is coupled to the tool carriage for selectively driving the tool carriage along the first dimension. Further, a support table is movably mounted on the tool carriage along an arcuate path corresponding to the cylindrical configuration of the core barrel. A second drive motor is mounted on the tool carriage and coupled to the support table for selectively driving the support table along the arcuate path. A third drive motor is mounted on the support table and is coupled to the tool for selectively disposing the tool along a second dimension aligned with respect to the radius of the cylindrical configuration, whereby the tool may be engaged and disengaged with and from the core barrel. In an illustrative embodiment of this invention, the tool takes the form of an arm for releasably holding a plug to be inserted into a selected one of the existing flow holes.

In a further aspect of this invention, there is included a sensor for sensing the location of a flow hole and a fourth drive motor mounted on the support table for disposing the sensor along the second dimension with respect to the core barrel. Further, a sensor arm is coupled to the fourth drive motor for carrying and positioning the sensor with respect to a flow hole.

The core barrel includes a plurality of pointers disposed thereon in a fixed relation with corresponding of the plurality of flow holes. An indicator is mounted upon the tool carriage to permit alignment of the remotely controlled apparatus with respect to corresponding ones of the plurality of flow holes.

Further, the remotely controlled apparatus includes a first encoder mounted on the tool carriage and coupled to the support table for providing an output signal indicative of the relative movement between said support table with respect to the indicator means along said arcuate path, and a second encoder mounted on the support table and coupled to the tool for providing an output signal indicative of the movement imparted to the tool by the third drive means along the second dimension.

BRIEF DESCRIPTION OF THE DRAWINGS

While the specification concludes with claims particularly pointing out and distinctly claiming the subject matter of the invention, it is believed that the invention will be better understood from the following description taken in conjunction with the accompanying drawings, wherein:

DESCRIPTION OF THE PREFERRED EMBODIMENT

Figure 1B:
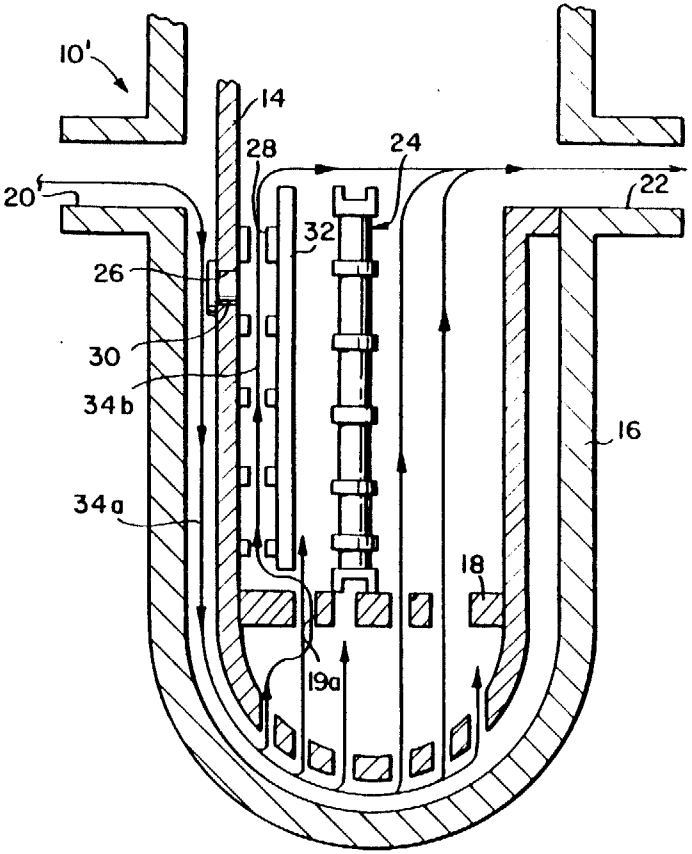
FIGS. 1A and 1B are respectively side, sectioned views of nuclear fuel reactors of a downflow design and of an upflow design, respectively.
Figure 1A:
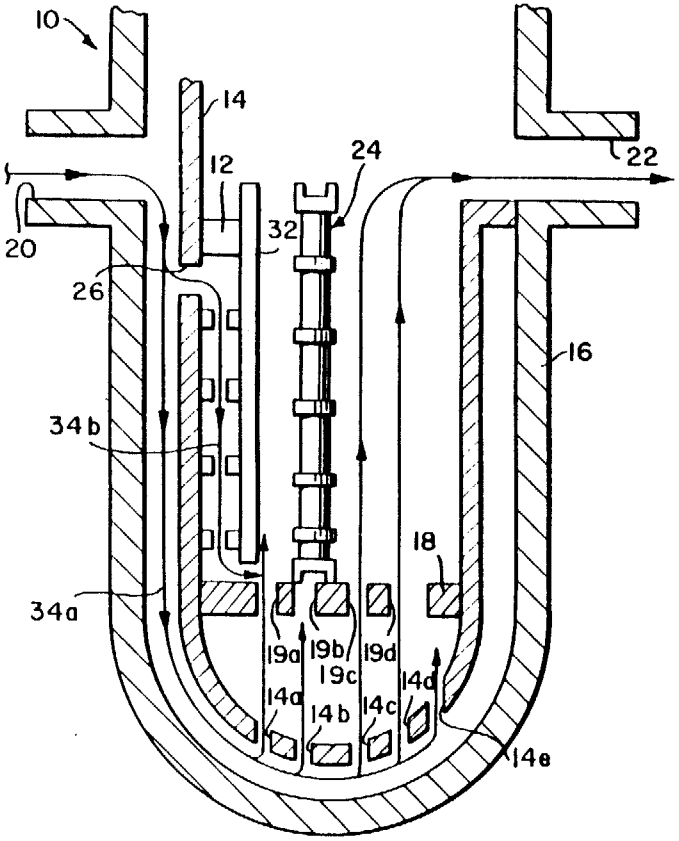
FIG. 1A. (PRIOR ART)
Figure 2B:
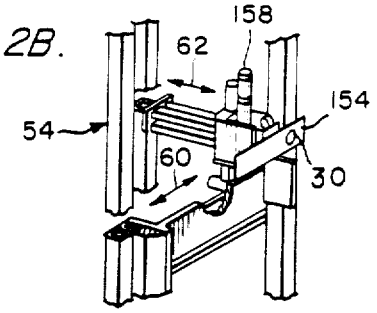
FIGS. 2A and 2B are respectively a perspective view of a core barrel of the nuclear reactor shown in FIGS. 1A and 1B as immersed in canal water and the locating, measuring and insertion apparatus of this invention as including a strongback assembly and a tool carriage assembly disposed for rectilinear motion along the strongback assembly, and an exploded view of the tool carriage assembly.

Referring now to the drawings and, in particular, to FIG. 2, there is shown a plug installation tool system 50 in accordance with the teachings of this invention to install plugs 30 in a plurality of existing flow holes 26 as disposed about the periphery of the core barrel 14. The plug installation tool system 50 includes a strongback assembly 52 and a tool carriage assembly 54 mounted upon the strongback assembly 52 for rectilinear motion therealong in a vertical direction, as shown in FIG. 2. The strongback assembly 52 includes a pair of claps 64a and 64b of a C-type configuration to fit over the flange 66 of the core barrel 14. A hydraulic clamp 72 is used to positively secure the clamps 64a and 64b and, thus, the strongback assembly 52 with respect to the core barrel 14. As illustrated in the expanded portion of FIG. 2, the tool carriage assembly 54 includes a plug arm 154 for carrying and inserting a plug 30 accurately within one of the existing flow holes 26. A plug arm drive motor 158 drives the plug arm 154 and its plug 30 in a rectilinear motion as indicated by the arrow 62. Similarly, a circumferential drive motor 140 drives the plug arm 154 in a rectilinear motion as indicated by the arrow 60, whereby the plug 30 may be accurately aligned with respect to one of the existing flow holes 26, before the plug arm drive motor 158 is energized to drive the plug 30 into the existing flow holes 26.

The existing flow holes 26 are disposed about the periphery of the core barrel 14 and it is necessary to reposition the strongback assembly 52 to permit the plugs 30 to be disposed in a next pair of existing flow holes 26, noting that the plug arm 154 may be moved right and left from the center of the strongback assembly 52. To this end, a temporary work bridge 42 is disposed over the refueling canal 36 and is movably driven along a pair of manipulator crane rails 46a and 46b whereby the temporary work bridge 42 and, thus, the strongback assembly 52 may be positioned selectively over the core barrel 14. A control panel is disposed upon a work deck 44 of the temporary work bridge 42 to permit control of the various functions of the plug installation tool system 50. When it becomes necessary to move the strongback assembly 52 about the periphery of the core barrel 14, the operator may readily position a hoist 49 directly over the strongback assembly 52 and, thereafter, attach the hoist cable to the strongback assembly 52, before actuating the hoist 49 to lift the strongback assembly 52. In this regard, the hoist 49 may be moved along its monorail 48 and the temporary work bridge 42 may be variously disposed over the core barrel 14.

Figure 3A:
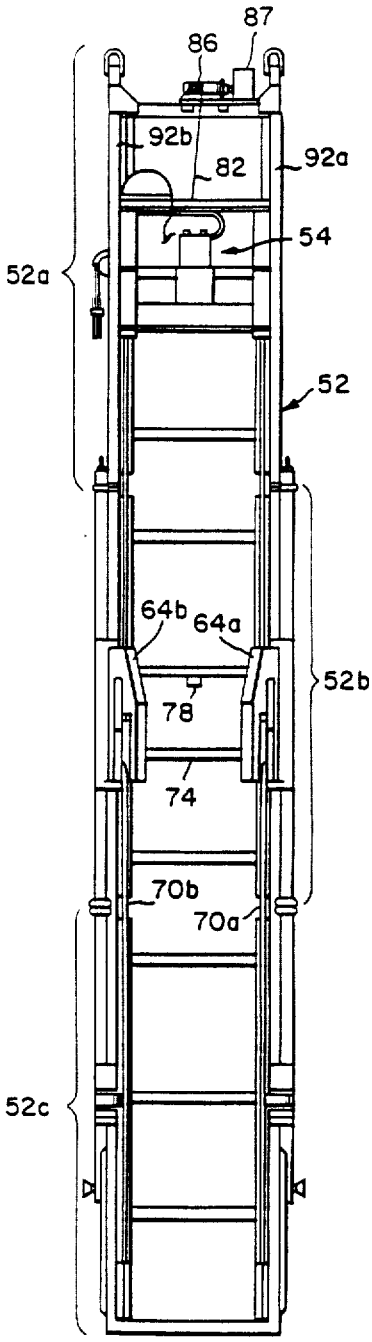
FIG. 3A, 3B and 3C are respectively detailed front, side and top views of the strongback assembly as generally shown in FIG. 2.
Figure 3B:
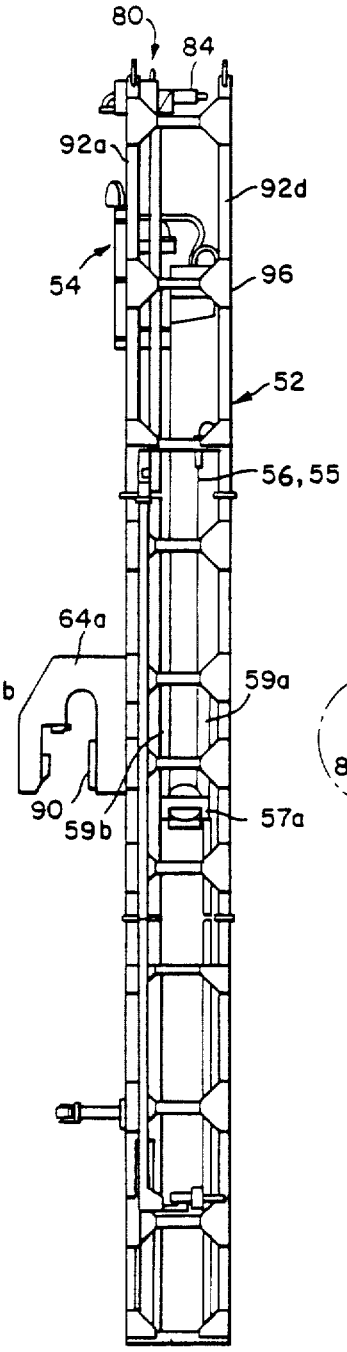

Referring now to FIGS. 3A and 3B, there is provided a detail showing of the structure of the strongback assembly 52 and the manner in which the tool carriage assembly 54 is driven rectilinearly along the length thereof. The strongback assembly 52 is comprised of lower, middle and top weldments 52a, 52b and 52c, thus, permitting the assembly 52 to be dismantled for shipment and reassembled at the site of the core barrel 14. Each weldment is comprised of four upright legs 92a, 92b, 92c and 92d. The structural integrity of the strongback assembly 52 is assured by a plurality of side braces 94 extending between the upright legs 92a and 92d, and legs 92b and 92c. In addition, back braces 98 are disposed between the upright legs 92d and 92c. The side and back braces 94 and 98 are attached by welding to the upright legs 92 and reinforced by gussets 96. A pair of Thomson rails 70a and 70b extend along the length of the strongback assembly 52 for guiding and supporting the tool carriage assembly 54 for rectilinear movement therealong.

Figure 3C:
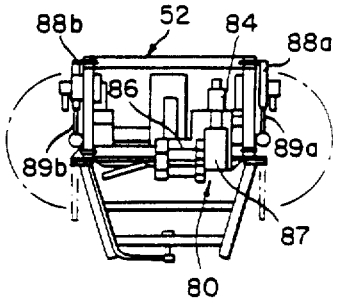

As shown in FIGS. 3A, 3B and 3C, a carriage hoist assembly 80 is mounted on top of the strongback assembly 52 for reeling in and out a hoist cable 82 connected at its remote end, as shown in FIG. 3A, to the tool carriage assembly 54, whereby the carriage 54 may be lowered and raised respectively along the length of the strongback assembly 52. The hoist assembly 80 includes a cable drive motor 84 mounted upon the top of the strongback assembly 52 and coupled by a gear mechanism 87 to drive a pair of cable reels 86, as shown in FIGS. 3C. The cable 82 is wound about the cable reel 86 and that the cable drive motor 84 is operative to rotate in opposite directions to reel in and reel out the hoist cable 82, whereby the carriage assembly 54 is respectively raised and lowered along the length of the strongback assembly 52.

As shown in FIG. 3C, a pair of TV cameras 88a and 88b is disposed on opposite sides of the strongback assembly 52. In particular, each of the cameras 88a and 88b is mounted upon corresponding positioning mechanisms 89a and 89b, whereby the cameras 88a and 88b may be disposed from a first or retracted position, as shown in full line in FIG. 3C, to an extended, viewing position, as shown in dotted line in FIG. 3C. The TV cameras 88a and 88b serve to permit direct observation of the existing flow holes 26, the inserted plugs 30, and the surrounding surfaces of the core barrel 14.

Figure 3D:
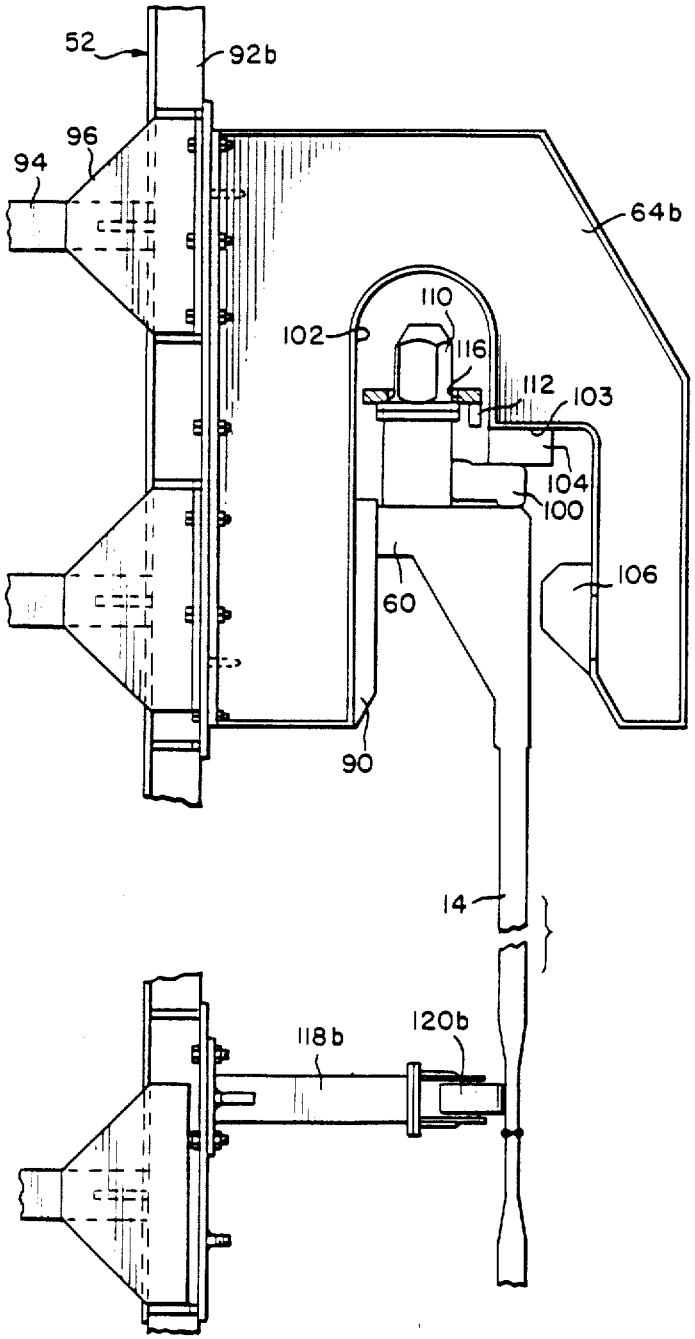
FIG. 3D is a partial, broken away, side view of a clamp for mounting the strongback assembly upon the core barrel.

Details of the clamps 64a and 64b and the manner in which the strongback assembly 52 is mounted upon the core barrel 14 are shown in FIG. 3D. The clamps 64a and 64b are securely affixed to the strongback assembly 52 as by bolting. Each of the clamps 64a and 64b includes a U-shaped recess 102 for receiving therein the flange 66 of the core barrel 14. The recess 102 is configured to provide a support surface 103 disposed substantially horizontal to provide a surface for supporting the weight of the clamps 64 and the strongback assembly 52 upon the flange 66 of the core barrel 14. As shown in FIG. 3D, the support surface 103 rests on a bearing pad 104, which in turn rests on a hold down spring 100. The hold down spring 100 is disposed between the bearing pad 104 and the upper surface of the flange 66. In addition, a pair of bearing pads 90 and 106 are disposed on either side of the flange 66 to prevent damage to either the flange 66 or the clamps 64 disposed thereon. As illustrated in FIG. 3D, the lateral dimensions of the recess 102, as well as the spacers 90 and 106, permit a degree of freedom for movement of the clamps 64a and 64b with respect to the flange 66. A pair of legs 118, of which one leg 118a is shown in FIG. 3D, is disposed on a lower portion of the strongback assembly 52. At the end of each leg 118 is disposed a rotatably mounted wheel 120 to permit circumferential motion of the strongback assembly 52 about the outer periphery of the core barrel 14.

Figure 3E:
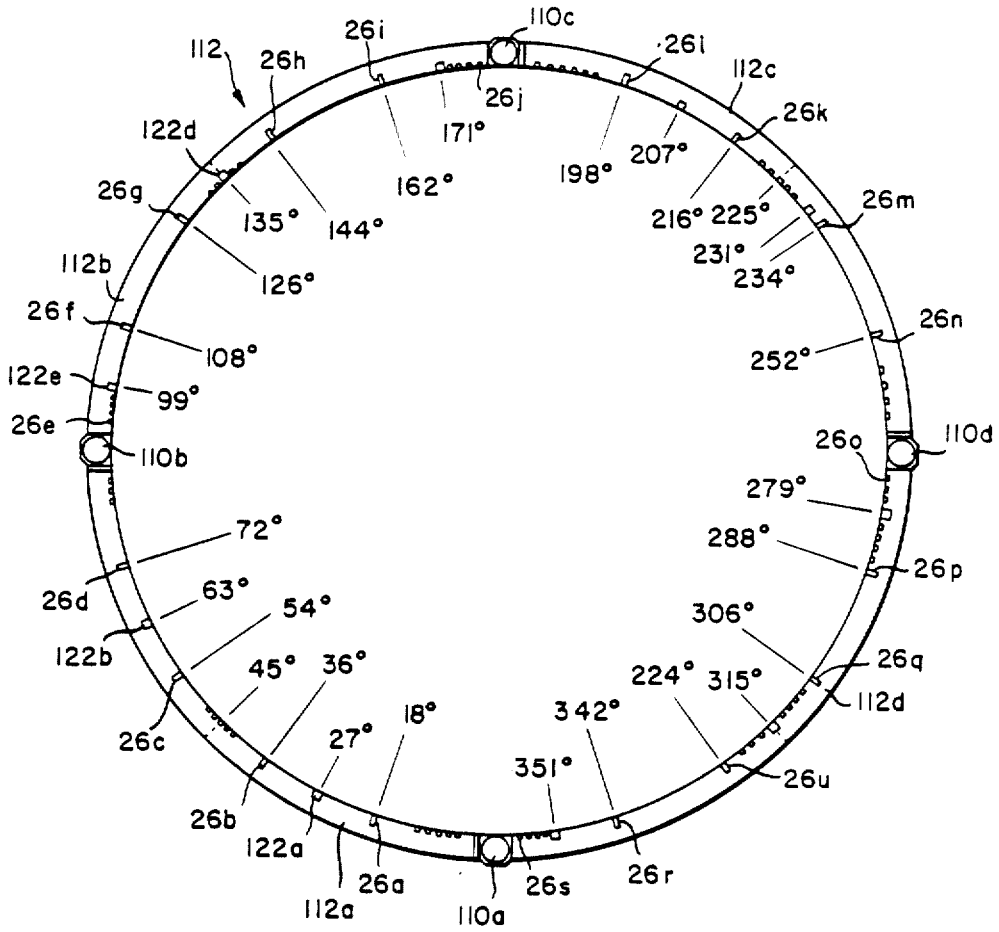
FIG. 3E is a plan view of a template disposed upon a flange of the core barrel for accurately positioning the strongback assembly with respect to the existent, coolant flow holes disposed within the core barrel.

Referring now to both of FIGS. 3D and 3E, a template 112 is illustrated as comprised of four equal 90° sectors 112a, 112b, 112c and 112d configured and dimensioned to cover to entire circumference of the flange 66 of the core barrel 14. A plurality of, illustratively four, locating pins 110 is disposed 90° apart about the circumference of the flange 66 and serves to accurately position the template 112 with respect to the core barrel 14 and its existing flow holes 26. As shown in FIG. 3D, a locating pin 110 is disposed in a close fitting relationship within an opening 116 through the template 112. As particularly illustrated in FIG. 3E, a plurality of existing flow holes 26a through 26s is disposed at varying angles about the circumference of the core barrel 14. In an illustrative embodiment of this invention, a plurality of pointers 122 is disposed along the periphery of the core barrel 14, each pointer 122 accurately locating a pair of existing flow holes 26 disposed on either side of the pointer 122. For example, the pointer 122a is disposed midway between the existing flow holes 26a and 26b. As will be explained later, if the strongback assembly 52 is accurately disposed by the hoist 49 with respect to one of the pointers 122, its position with respect to the corresponding pair of existing flow holes 26 is accurately determined. In an illustrative embodiment of this invention, the template 112 is made of a metal, illustratively of a stainless steel, having dimensions of 4"×3"×0.25" thick.

Figure 4A:
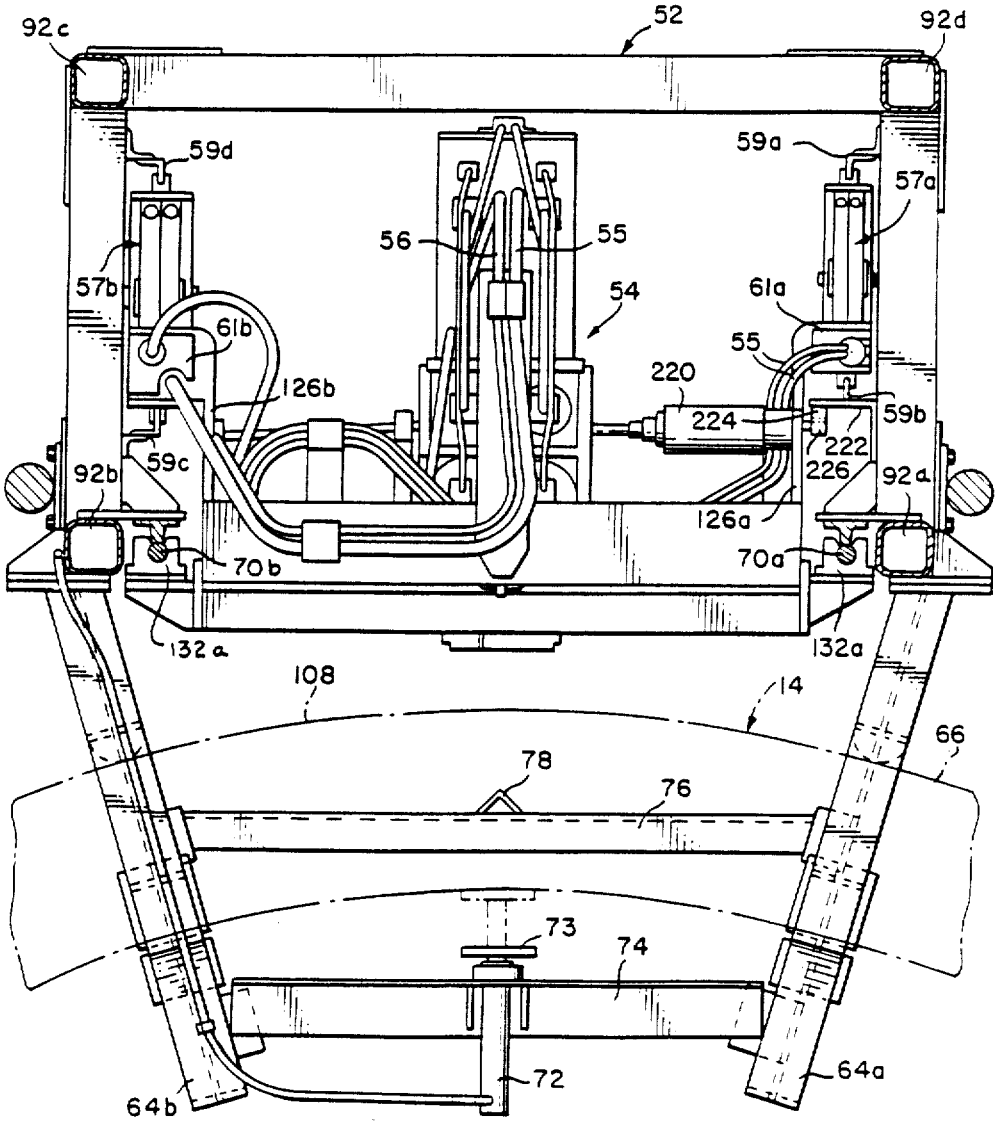
FIG. 4A is a plan view of the tool carriage assembly as mounted upon the strongback, showing its relationship to the core barrel.

Referring now to FIG. 4A, there is shown a plan view of the top of the strongback assembly 52 and its clamps 64a and 64b, illustrating the manner in which the clamps 64a and 64b are disposed about the flange 66 of the core barrel 14. An outer peripheral surface 108 of the flange 66 is machined to close tolerance in the order of ±0.03 inch to provide a reference surface against which the strongback assembly 52 is mounted. As a result, the radial distance from the strongback assembly 52 to the core barrel 14 and its existing flow holes 26 is accurately established. Further, a jack support brace 74 is disposed between the clamps 64a and 64b, with its opposite ends fixedly secured to corresponding one's of the clamps 64a and 64b. The hydraulic jack 72 is fixedly disposed at the center line of the jack support base 74. After the strongback assembly 52 and its clamps 64a and 64b have been disposed upon the flange 66 of the core barrel 14, pressure is increased within the hydraulic jack 72, thereby disposing its piston 73 from its retracted position as shown in full line in FIG. 4A, to its extended position shown in dotted line in FIG. 4A, whereby the strongback assembly 52 is fixedly secured to the core barrel 14.

Further, an indicator support brace 76 is likewise attached between the clamps 64a and 64b for centrally supporting an indicator 78. As illustrated in FIG. 4A, the indicator 78 permits alignment with a selected one of the pointers 22 set on the template 112. In operation, the operator manipulates the hoist 49 to place the strongback assembly 52 in a position such that its indicator 78 is aligned with a selected one of the pointers 122. In this manner, the strongback assembly 52 and, in particular, its tool carriage assembly 54 is disposed in a known relationship with that pair of existing flow holes 26 disposed on either side of the pointer 122, as explained above.

As shown in FIGS. 3A and 3B, the tool carriage assembly 54 is mounted by the Thomson rails 70a and 70b for rectilinear motion on the strongback assembly 52. As shown in FIGS. 4A and 4C, a resolver 220 is mounted upon a side bracket 126a to sense the relative movement of the tool carriage assembly 54 with respect to the strongback assembly 52 and, in particular, to provide a train of pulses, each pulse indicative of a units, linear movement. As particularly shown in FIG. 4A, the resolver 220 includes a pinion gear 226 engaging a track 224 mounted on the strongback assembly 52 by an angle support 222. The angle support 222 and the track 224 extend the vertical length of the strongback assembly 52. As the tool carriage assembly 54 moves rectilinearly along the length of the strongback assembly 52, the pinion gear 226 meshing with the track 224 causes the encoder 220 to provide the aforementioned train of pulses.

In order to actuate the various hydraulic devices and electrical motors included within the tool carriage assembly 54, it is necessary to run hydraulic cables 55 and electrical cables 56, as shown in FIG. 4A, from the top of the strongback assembly 52 to the tool carriage assembly 54, as generally illustrated in FIG. 3B. Thus, it is necessary to compensate for the slack that may exist in the hydraulic cables 55 and electrical cables 56 as the tool carriage assembly 54 is moved up and down the strongback assembly 52. To this end, a pair of counterweight pulley assemblies 57a and 57b, as shown in FIG. 4A, receive the hydraulic cables 55 and electrical cables 56, and exert a downward force thereon, as illustrated in FIG. 3B. As illustrated in FIG. 4A, each of the counterweight pulley assemblies 57 is mounted respectively upon a first pair of vertical tracks 59a and 59b, and a second pair of vertical tracks 59a and 59c. In turn, each pair of the vertical tracks 59 is affixed to the left or right side of the strongback assembly 52, as shown in FIG. 4A, and oriented to extend the length thereof, as shown in FIG. 3B. Further, the tool carriage assembly 54 includes a pair of side brackets 126a and 126b for respectively mounting a pair of guide members 61a and 61b for directing the hydraulic cables 55 and electrical cables 56 downwardly from the tool carriage assembly 54 to their counterweight pulley assemblies 57a and 57b.

Figure 4B:
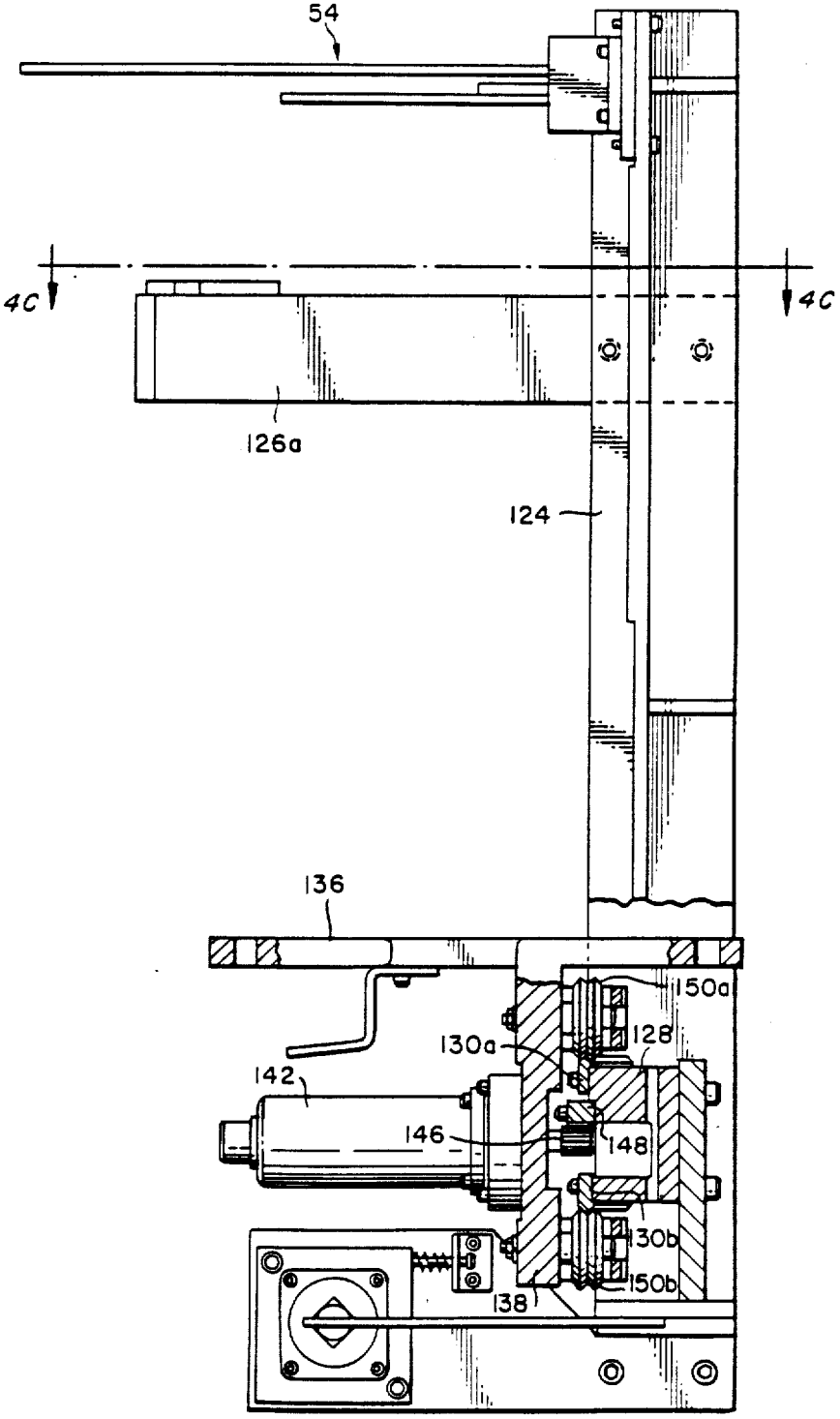
FIGS. 4B and 4C are respectively a sectioned side view of the tool carriage assembly and a sectioned plan view of the tool carriage assembly as taken along lines 4c—4c of FIG. 4B.
Figure 4C:
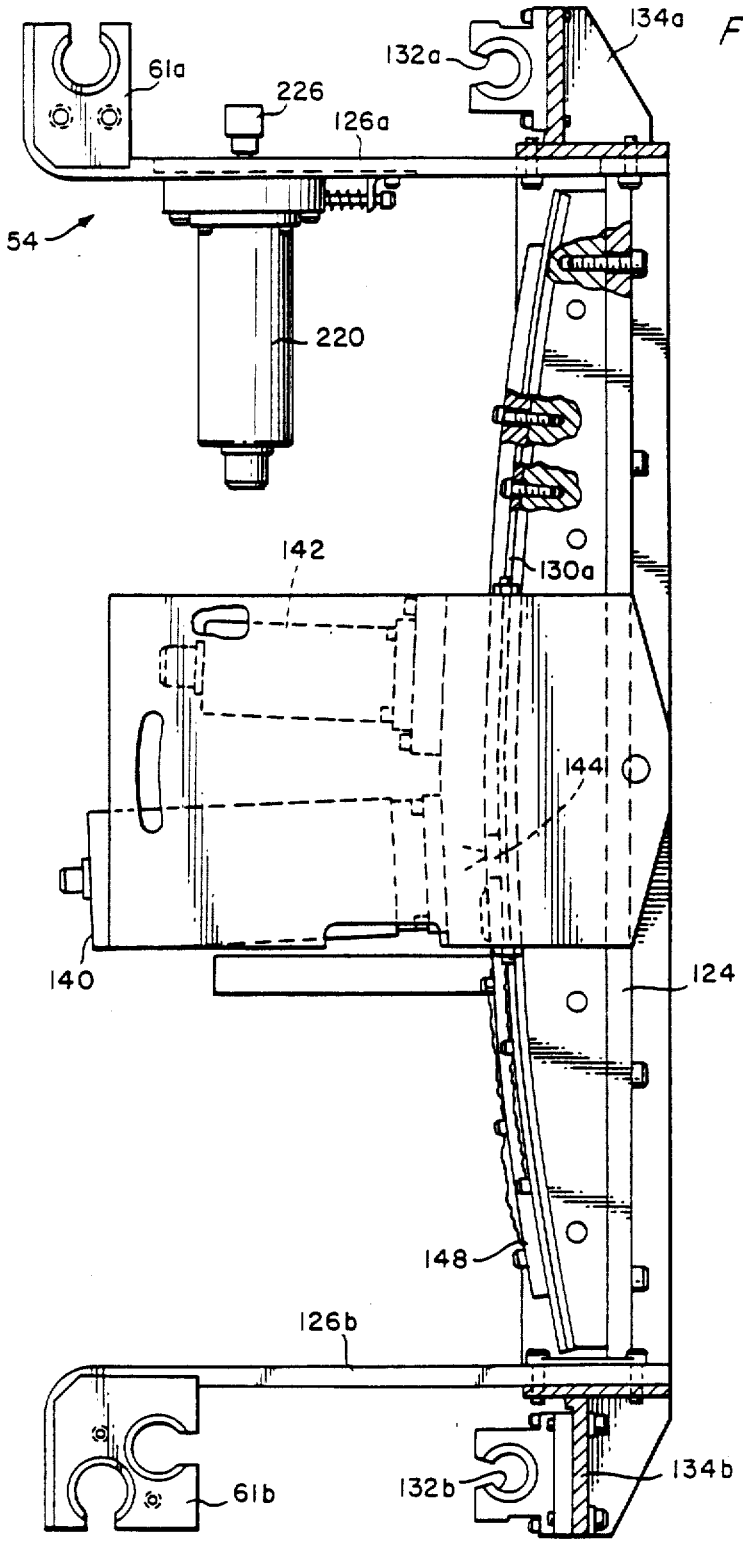

Referring now to FIGS. 4B and 4C, the details of the tool carriage assembly 54 are shown. The carriage assembly 54 provides the circumferential and radial drive systems for locating a plug 30 opposite one of the existing flow holes 26 in the core barrel 14 and, thereafter, for inserting the plug 30 into an aligned existing flow holes 26. As shown best in FIG. 4B, the tool carriage assembly 54 includes a circumferential table 136 that is driven rectilinearly along an actuate path corresponding to the curvature of the flange 66 of the core barrel 14. In particular, the circumferential table 136 is driven along a pair of curved upper and lower tracks 130a and 130b. Though not shown in FIGS. 4B and 4C, it is understood that a radial drive assembly 152 is mounted upon the table 136, as will be explained below with respect to FIGS. 5A and 5B.

As illustrated in FIGS. 4B and 4C, the tool carriage assembly 54 includes a carriage frame weldment 4. The side brackets 126a and 126b is attached to either end of the carriage frame weldment 124. As illustrated in FIG. 4B, the pair of upper and lower tracks 130a and 130b is mounted upon the carriage frame weldment 124. Further, a pair of bearing brackets 134a and 134b is disposed at either end of the carriage frame weldment 24 for mounting a pair of Thomson bearings 132a and 132b. As specifically shown in FIG. 4A, the Thomson bearings 132a and 132b receive corresponding Thomson rails 70a and 70b, whereby the tool carriage assembly 54 moves rectilinearly along the length of the strongback assembly 52.

As particularly illustrated in FIG. 4B, the circumferential table 136 includes a vertically disposed support member 138 upon which are mounted an upper pair of guide wheels 150a and a lower pair of guide wheels 150b for respectively receiving the upper track 130a and the lower track 130b. A track support 128 is affixed to the carriage frame weldment 124 and mounts and upper and lower tracks 130a and 130b in positions to engage the pairs of guide wheels 130a and 130b, respectively. Further, a rack 148 of a curved configuration similar to that of the upper and lower tracks 130a and 130b and the core barrel 14, is likewise mounted upon the track support 128. As shown in FIGS. 4B and 4C, a circumferential drive motor 140 and a circumferential encoder 142 are mounted upon the circumferential table 136 and include pinion gears 144 and 146, respectively, each engaging the rack 148. The circumferential encoder or resolver 142 provides feedback signals indicative of the position of the circumferential table 136 and, in particular, the radial drive assembly 152 mounted thereon with respect to the indicator 78 and, therefore, the corresponding pair of existing flow holes 26.

Figure 5A:
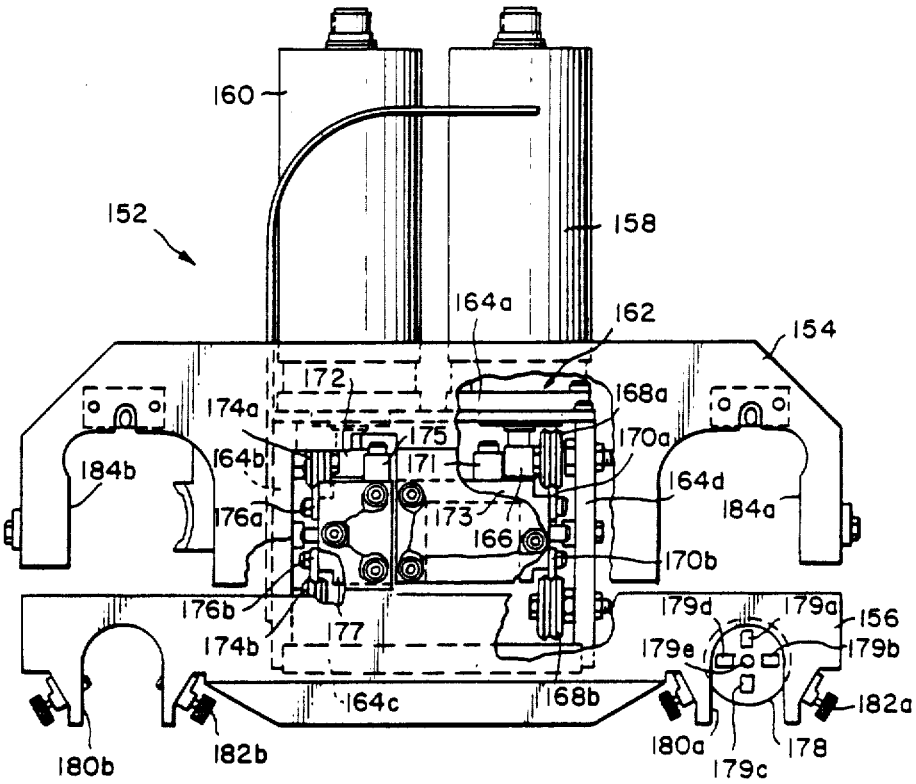
FIGS. 5A and 5B are respectively a front, partially broken away view and a side, partially broken away view of a radial drive assembly that is mounted upon the tool carriage assembly, as shown in FIGS. 4A, 4B and 4C.
Figure 5C:
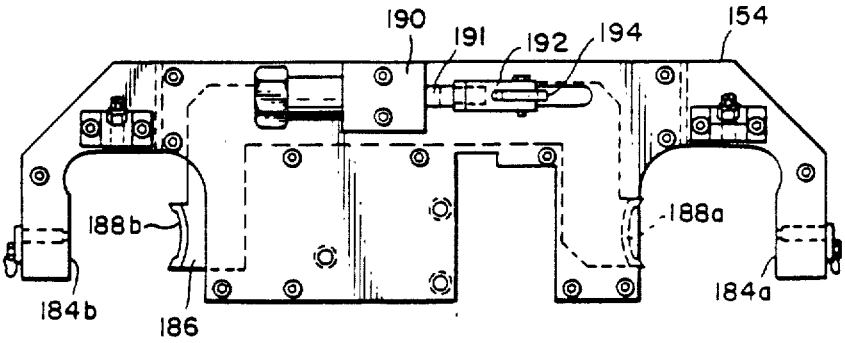
FIG. 5C is a front view of the plug arm as rectilinearly driven and supported by the radial drive assembly of FIGS. 5A and 5B.
Figure 5B:
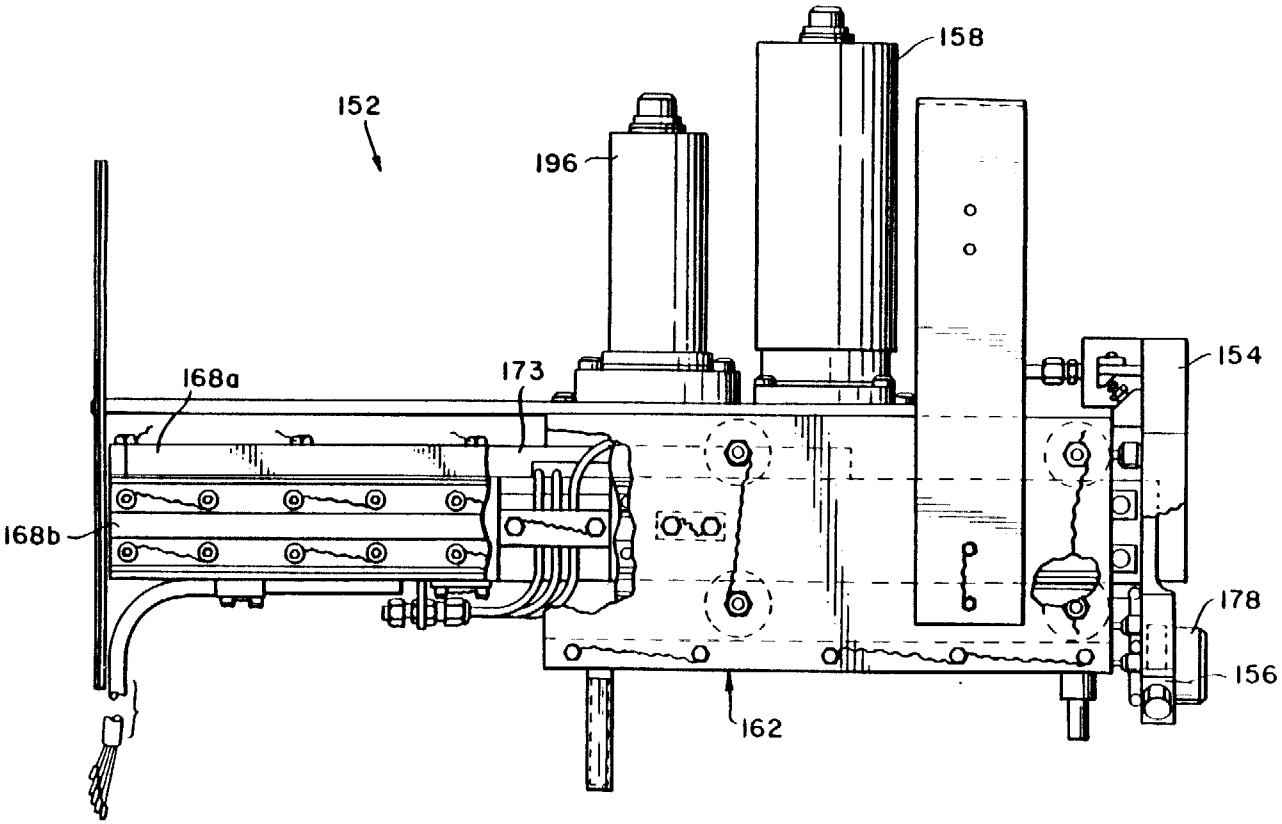

The radial drive assembly 152 that is fixedly secured to the circumferential table 136 of the tool carriage assembly 54 is more fully shown in FIGS. 5A and 5B. The radial drive system 152 includes a plug arm 154 for releasably carrying and inserting a plug 30 into an existing flow flow hole 26, and a probe arm 156 for carrying and variably positioning a probe 178 which serves to located and to provide an indication indicative of the measurements of the existing flow holes 26. In an illustrative embodiment of the invention, the probe 178 may take the form of an array of eddy current devices 179, as shown in FIG. 5A. In particular, four eddy current devices 179a, 179b, 179c and 179d are equally spaced from each other about the circumference of the probe 178, whereas a fifth eddy current device 179e is disposed along the axis of the probe 178. The axially disposed eddy current device 179e provides an electrical signal indicative of the radial distance between the probe 178 and the peripheral surface of the core barrel 14. The circumferential table 178 supporting the probe arm 156 and its probe 178 may be scanned back and forth across the surface of the core barrel 14, while the output of the eddy current device is observed. When the output of the eddy current device 179e reaches a maximum, there is an indication that the eddy current device 179e is partially aligned with the vertical axis of a corresponding flow hole 26. It is further necessary to align the probe 178 with respect to the horizontal axis of the flow hole 26 by moving the tool carriage assembly 54 vertically with respect to the flow hole 26 until a maximum output signal is derived from the eddy current device 179e, indicating that the probe 178 is aligned with a horizontal axis passing through the center of the corresponding flow hole 26. The probe 178 may be disposed in this manner to an accuracy of approximately 0.10 inch with respect to the center of a corresponding flow hole 26. After being so aligned, the radial drive assembly 152 is actuated to insert the probe 178 into the aligned, existing flow hole 26. Thereafter, the eddy current devices 179a, 179b, 179c and 179d are used to more accurately position the probe 178 with respect to its existing flow hole 26, as well as to measure the diameter of the hole 26. In particular, left and right eddy current devices 179b and 179e, as well as top and bottom eddy current device 179a and 179c, are coupled together to provide difference and sum signals. In the aligning process, difference signals are obtained in order to precisely position the probe 178 with respect to the axis of the existing flow hole 26 to a tolerance of 1.5 mils. After being precisely aligned, the output signals of the corresponding eddy current devices 179 are summed to provide an accurate indication of the diameter of the aligned, existing flow hole 126.

As shown in FIG. 5A, the plug arm 154 is associated with a plug arm drive motor 158 and a plug arm resolver 196. The plug arm drive motor 158 and the plug arm resolver 196 are supported upon a support frame 162 comprised, as shown in FIGS. 5A and 5B, of a top plate 164a, side plates 164b and 164d, and a bottom plate 164c. The bottom plate 164c is in turn affixed to the circumferential table 136, as shown in FIG. 4B. Each of the plug arm drive motor 158 and the plug arm resolver 196 includes a corresponding pinion gear. The pinion gear 166 driven by the plug arm drive motor 158 is illustrated in FIG. 5A; the pinion gear for the plug arm resolver 196 is not illustrated in the drawings. Each of these pinion gears engages a rack 171, coupled to drive the plug arm 154. The plug arm resolver 196 provides electrical signals indicative of the precise precision position of the plug arm 154. As shown in FIG. 5A, upper and lower pairs of guide wheels 168a and 168b are rotatably mounted upon the side plate 164d of the support frame 162. Upper and lower tracks 170a and 170b are affixedly attached to a plug arm slide 173, as shown in FIGS. 5A and 5B. The plug arm slide 173 is in turn affixed to and supports the plug arm 154 for rectilinear motion in the radial direction.

Similarly, there is provided a probe arm drive motor 160, shown in FIG. 5A, and a probe arm resolver not illustrated. The probe arm drive motor 160 has a pinion gear 172 and the probe arm resolver has a pinion; each of these pinion gears engages a rack 175 affixed to a probe arm slide 177. In turn, the probe arm slide 177 is affixed to the probe arm 156, whereby the probe arm 156 is rectilinearly driven in a radial direction and an output signal obtained from the probe arm resolver indicative of the precise position of the probe arm 156 with respect to the core barrel 14. As illustrated in FIG. 5A, an upper pair of guide wheels 174a and a lower pair of guide wheels 174b are rotatably mounted upon the side plate 164b of the support frame 62. An upper track 176a and a lower track 176b are affixed to the probe arm slide 177 and are positioned to engage and to be mounted respectively upon the upper and lower pair of guide wheels 174a and 174b.

The probe arm 156 has a pair of recesses 180a and 180b disposed on either end for receiving the probe 178. Illustratively, the probe 178 is held in its recess 180 by a pair of set screws 182; one pair of set screws 182a is associated with the recess 180a, while a second pair of set screws 182b is associated with the recess 180b.

Referring now to FIG. 5C, the plug arm 154 is shown in greater detail. A pair of recesses 184a and 184b is disposed within each end of the plug arm 154. A slide 186 is mounted with respect to the probe arm 154 for rectilinear motion along a horizontal direction, as shown in FIG. 5C. The slide 186 serves to grasp and retain a plug within one of the recesses 184. In FIG. 5C, the slide 186 is disposed to the left to that position as would retain a plug 30 within the recess 184b. It is understood that the slide could be disposed to the right, as seen in FIG. 5C, to retain a plug within the recess 184a. The slide 186 is provided with a pair of curved, gripping surface 188a and 188b for effecting a secure gripping of the plug 30, which is of a like configuration. The slide 186 is rectilinearly driven by a double acting hydraulic cylinder 190. The hydraulic cylinder 190 drives a piston 191 coupled to a clevis 192, which is in turn coupled by a drive bracket 194 to move the slide 186 with a rectilinear movement.

In an illustrative embodiment of this invention, each of the circumferential drive motor 140, the plug arm drive motor 158 and the probe arm drive motor 160 may taken the form of a globe motor manufactured by TRW Company under their designation type BL 102 A818-10. The cable drive motor 84 may illustratively taken the form of that servomotor manufactured by Electrocraft Corporation under their designation 0670-07-021. The resolvers 142, 196, 198 and 220 may take the form of those encoders as manufactured by Computer Conversion Corporation under their designation number NES 90-DBC-10-1.

Figure 6:
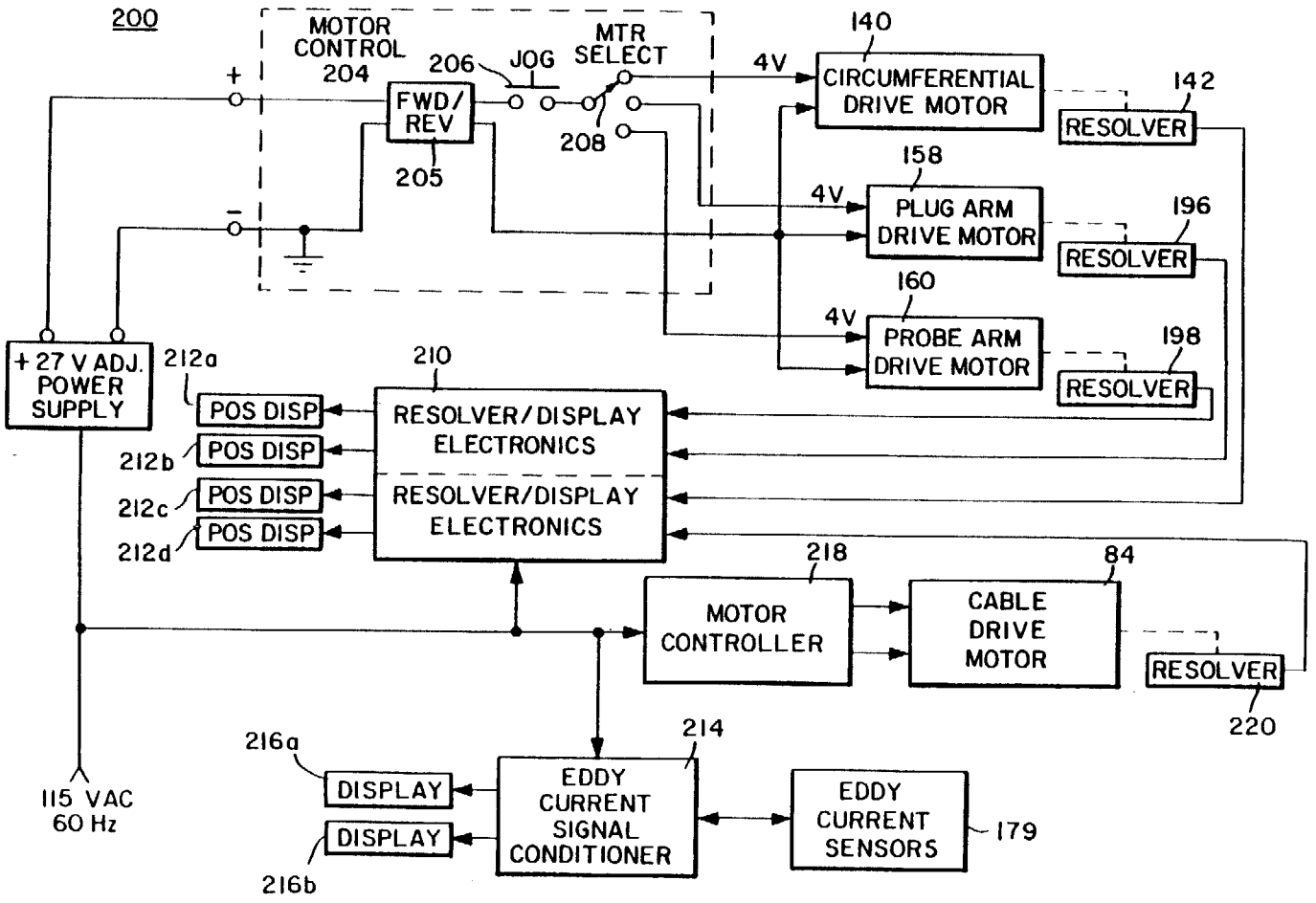
FIG. 6 is a functional block diagram of the elements for energizing and controlling the various functions of the tool carriage assembly.

Referring now to FIG. 6, there is shown a control circuit 200 for selectively energizing and controlling the various motors associated with the strongback assembly 52, its tool carriage assembly 54 and the hoist 49. Readily available 60 Hz alternating current voltage is applied to a power supply 202 for providing a DC voltage output to a motor controlled circuit 204. The motor control circuit 204 includes a forward/reverse control 205, a jog switch 206 and a meter select switch 208. The jog switch 206 is actuated to increase the voltage as applied to the selected one of the drive motors 140, 158 and 160, whereby the corresponding motor is driven at a greater speed. The operator disposes the motor select switch 208 to any one of its three positions a, b and c to respectively energize one of the circumferential drive motor 140, the plug arm drive motor 158 and the probe arm drive motor 160. Similarly, the operator manipulates the forward/reverse control 205 to direct the selected motor in a forward or reverse direction. As illustrated by a dash-line in FIG. 6, each of the aforementioned motors is mechanically coupled with a corresponding circumferential resolver 142, plug arm resolver 196, and probe arm resolver 198. The output signals of these resolvers 142, 196 and 198 are respectively indicative of the position circumferential table 136 and its radial drive assembly 52 with respect to the indicator 78, the plug arm 154 with respect to the machined surface 108 of the core barrel 14, and the probe arm 156 with respect to the machined surface 108 of the core barrel 14. In turn, these signals are applied to a resolver/display electronic circuit 210, which in turn displays these signals upon corresponding display devices 212a, 212b and 212c.

The alternating current voltage is also applied to a motor controller 218 which in turn energizes the hoist motor, whereby the hoist cable 82 and the tool carriage assembly 54 connected to an end thereof is driven up and down the strongback assembly 52. The cable drive motor 84 is in turn coupled to the resolver 220 which provides an output signal indicative of the position of the tool carriage assembly 54, as explained above; the output of the encoder 220 is applied to a resolver/display electronics 210 for providing a corresponding signal to a position display 212d indicative of the position of the tool carriage assembly 54 with respect to the strongback assembly 52.

As seen in FIG. 6, the eddy current sensor 178 is coupled to an eddy current signal conditioner 214 which in turn provides signals to display devices 216a and 216b. As explained above, the probe 178 includes the five eddy current devices 179. The output signals of the five eddy current devices 179a, 179b, 179c, 179d and 179e are applied to an eddy current signal conditioner 214 to provide output signals to display devices 216a and 216b. Illustratively, the display device 216a provides an output corresponding to the eddy current sensor 179e indicative of the radial distance between its probe 178 and the outer peripheral surface of the core barrel 14. In turn, the display device 216b provides selectively indications of the signal differences of the coupled eddy current devices 179b and 179e, and 179a and 179c, as well as the signal sums of the aforementioned eddy current sensors. As noted above, the difference signals serve to precisely orient the probe 178 with respect to an existing flow hole 26, whereas the sum signals provide an accurate indication of the diameter of the aligned, existing flow hole 26. In an illustrative embodiment of this invention, the eddy current sensors 179a to d, and 179e may take the form, respectively, of the eddy current sensors as manufactured by Kaman under their designations 2UB1 (KD 4000 Series) and 3U1, and the signal conditioner 214 takes the form of that circuit manufactured by Kaman under their designation KD4056.

Figure 2A:
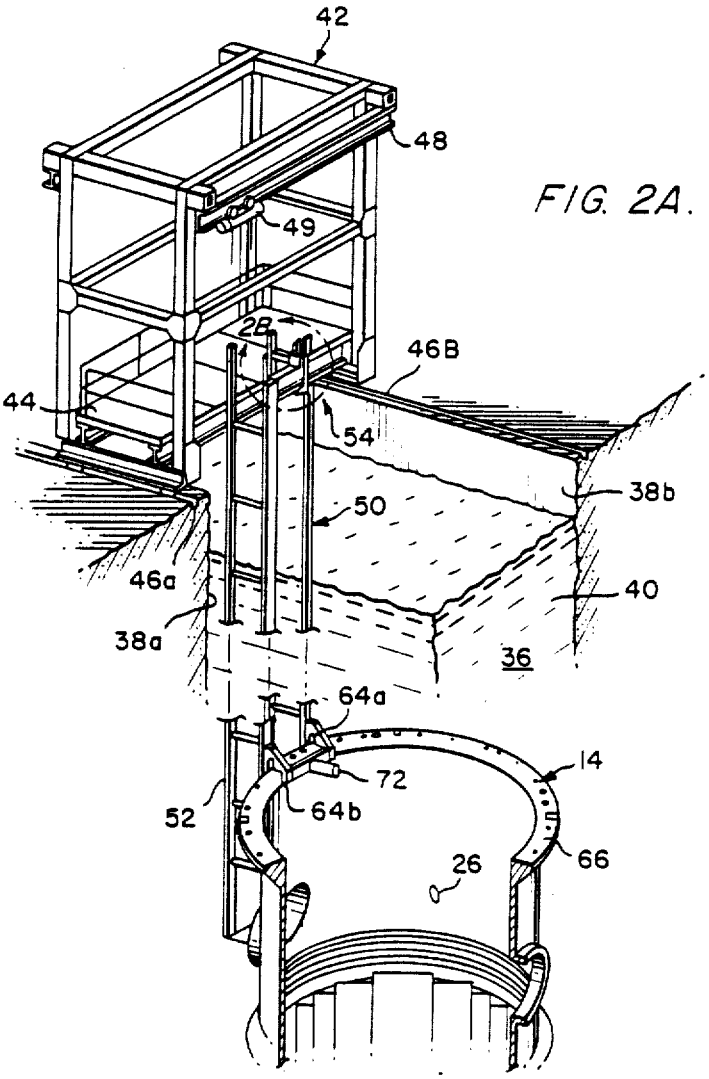

The method of installing a plug 30 within one of a complimentary pair of existing flow holes 26 will now be described. First, the hoist 49, as seen in FIG. 2A, is used to lower the strongback assembly 52 onto the core barrel 14 and, in particular, to place the clamps 64a and 64b of the strongback assembly 52 about the flange 66. As shown in FIG. 4A, the pointer 78 is aligned with a corresponding one of the pointers 122, whereby the precise position of a complimentary pair of existing flow holes 26 is known, as shown in FIG. 3E. Next, the circumferential table 136 is driven by its circumferential drive motor 140 as far right or far left as possible, dependent upon whether a left-handed or right-handed plug 30 of the complimentary pair is to be inserted.

Thereafter, each of the plug arm 154 and the probe arm 156 is withdrawn from the peripheral surface of the core barrel 14. If not previously done, a probe 178 is mounted within one of the recesses 180, whereas a plug is disposed within a corresponding one of the recesses 184. Next, the tool carriage assembly 54 is lowered from its top-most position to a next position aligned with the existing flow holes 26. Next, the probe arm 156 carrying the probe 178 is driven toward the core barrel 14 to within approximately 0.125 inches. Next, the circumferential drive motor 140 is energized to sweep the probe 178 past the corresponding existing flow hole 26. When a maximum output signal from the eddy current sensor 179e is observed on the display device 216a, the horizontal location of the hole 26 is obtained by noting the horizontal coordinate as derived from the output signal of the resolver 142 associated with the circumferential drive motor 140 and displayed upon the position display 212c. Next, it is necessary to recheck the vertical position of the existing flow hole 26. In particular, the tool carriage assembly 54 carrying the probe arm 156 and its probe 178 is moved vertically until the eddy current sensor 179e provides a maximum output signal, indicating that the probe 178 is aligned with respect to the horizontal axis of the existing flow hole 26. Now, the output of the resolver 220 associated with the cable drive motor 84, as displayed upon the display 212d, is observed to obtain the vertical coordinate of the hole 26. As explained above, the precise diameter of the existing flow hole 26 is then observed upon the display device 212b and, if the selected plug 30 is of a corresponding diameter, the probe 178 is withdrawn, and the tool carriage assembly 54 is lowered a distance corresponding to that distance between the plug arm 154 and the probe arm 156. Thereafter, the plug arm drive motor 158 is energized, whereby the plug arm 154 is driven radially toward the core barrel 14 inserting its plug 30 within the aligned existing flow hole 26. The corresponding TV camera 88 is used to visually verify that the plug 30 has been inserted within its existing flow hole 26. Thereafter, pressure is applied to the plug 30, whereby the plug 30 is expanded fitting tightly within its existing flow hole 26. Thus, pressure is released within the hydraulic cylinder 90, as seen in FIG. 5C, whereby the slide 86 releases the plug 30, before the plug arm 154 is withdrawn and the carriage tool assembly 54 is returned to the elevation of the work deck 44, as seen in FIG. 2A. Thereafter, the probe 178 is disposed to the other recess 180 of the probe arm 156 and another plug 30 is disposed within a corresponding recess 184 of the plug arm 154. The above steps are then repeated to insert the next plug 30 into the other of the complimentary existing flow holes 26. Thereafter, the strongback assembly 72 is repositioned so that its indicator 78 is aligned to the next pointer 122 and the next set of plugs 30 are inserted.

In considering this invention, it should be remembered that the present disclosure is illustrative only and the scope of the invention should be determined by the appended claims.

We claim:

1. Support apparatus for supporting and selectively locating a tool and respect to its work piece, the work piece having first and second dimensions, said support apparatus comprising:

(a) a tool carriage for receiving the tool;

(b) a support structure for supporting and guiding said tool carriage with respect to the workpiece;

(c) first drive means mounted on said support structure and coupled to said tool carriage for selectively driving said tool carriage along said first dimension;

(d) rail means mounted on said tool carriage along said second dimension;

(e) a support table mounted for movement along said rail means;

(f) [second drive means mounted on said tool carriage selectively driving the tool along said second dimension, said] second drive means mounted on said support table and engaging said tool carriage to drive said support table along said rail means, whereby the tool may be accurately positioned with respect to the work piece; and (g) clamp means affixed to said support structure for engaging the work piece for suspending said support structure, whereby said support structure extends along said first dimension of said work piece.

2. Support apparatus as claimed in claim 1, wherein said support structure includes an indicator for aligning said support structure with respect to the workpiece.

[3. Support apparatus as claimed in claim 1, wherein the workpiece includes a third dimension and there is further included third driving means mounted on said tool carriage for selectively drive the tool along aid third dimension with respect to the workpiece.]

4. Support apparatus as claimed in claim 1, wherein the workpiece includes a third dimension and there is further included third drive means mounted on said support table for driving the tool along said third dimension with respect to the workpiece.

5. Support apparatus as claimed in claim 4, wherein there is included a tool mounting arm affixed to said third drive means to be driven thereby along said third dimension.

6. Support apparatus as claimed in claim 5, wherein said tool receiving arm includes means for releasably grasping the tool.

7. Support apparatus as claimed in claim 4, wherein the workpiece includes at least one work surface and there is further included sensing means for sensing the location of the work surface and fourth drive means mounted on said support table for disposing said sensing means along said third dimension with respect to the workpiece and its work surface.

8. Support apparatus as claimed in claim 7, wherein there is further included a sensing means arm coupled to said fourth drive means for carrying said sensing means.

9. Support apparatus as claimed in claim 1, wherein the workpiece includes at least one work surface and a pointer disposed thereon in a fixed relation with the work surface, and there is further included indicator means mounted upon said tool carriage to permit alignment of said support apparatus with respect to the work surface.

10. Support apparatus as claimed in claim 9, wherein said second drive means is mounted on said [tool carriage] *support table* in a fixed relationship with respect to said indicator means for moving the tool with respect to said indicator means as aligned with the pointer to align the tool with respect to the work surface.

11. Support apparatus as claimed in claim 10, wherein there is included encoder means mounted on said [tool carriage] *support table* and coupled to the tool for providing an output signal indicative of the relative movement of the tool with respect to said indicator means.

12. Support apparatus as claimed in claim 4, wherein there is included first encoder means mounted on said [tool carriage and coupled to said support table] *support table and engaging said tool carriage* for providing an output signal indicative of the relative movement between said support table and said tool carriage along said second dimension, and second encoder means mounted on said support table and coupled to the tool for providing an output signal indicative of the movement imparted to the tool by said third drive means along said third dimension.

13. In a nuclear reactor having a core barrel of a substantially cylindrical configuration with an axis and a plurality of flow holes disposed therethrough, a remotely controlled apparatus for supporting and selectively disposing a tool with respect to the core barrel, said remotely controlled apparatus comprising:

(a) a tool carriage for receiving the tool;

(b) a strongback assembly for supporting and guiding said tool carriage with respect to the core barrel;

(c) clamp means affixed to said strongback assembly for engaging the core barrel for suspending said strongback assembly along a first dimension substantially parallel to the axis of the core barrel;

(d) first drive means mounted on said strongback assembly and coupled to said tool carriage for selectively driving said tool carriage along said first dimension;

(e) a support table;

(f) means mounted on said tool carriage for supporting said support table for movement along an arcuate path corresponding to said cylindrical configuration; and (g) second drive means on said [tool carriage] *support table* and [coupled to said support table] *engaging said tool carriage* for selectively driving said support table along said arcuate path, whereby the tool is accurately positioned with respect to the core barrel.

14. The remotely controlled apparatus as claimed in claim 13, wherein there is further included third drive means mounted on said support table and coupled to said tool for selectively disposing said tool along a second dimension aligned with respect to a radius of said cylindrical configuration, whereby said tool may be engaged with and disengaged from said core barrel.

15. The remotely controlled apparatus as claimed in claim 14, wherein there is included a tool mounting arm affixed to said third drive means to be driven thereby along said second dimension.

16. The remotely controlled apparatus as claimed in claim 15, wherein said tool mounting arm includes means for releasably grasping a plug to be selectively inserted within one of said plurality of flow holes.

17. The remotely controlled apparatus as claimed in claim 16, wherein the workpiece includes at least one work surface and there is further included sensing means for sensing the location of one of said plurality of flow holes and fourth drive means mounted on said support table for disposing said sensing means along said second dimension with respect to said core barrel.

18. The remotely controlled apparatus as claimed in claim 17, wherein there is further included a sensing means arm coupled to said fourth drive means for carrying said sensing means.

19. The remotely controlled apparatus as claimed in claim 18, wherein said core barrel includes at least one pointer disposed thereon in a fixed relation with corresponding of said plurality of flow holes, and there is further included indicator means mounted upon said tool carriage to permit alignment of said remotely controlled apparatus with respect to said corresponding of said plurality of flow holes.

20. The remotely controlled apparatus as claimed in claim 19, wherein said second drive means is mounted on said [tool carriage] *support table* in a fixed relationship with respect to said indicator means for moving said tool with respect to said indicator means as aligned with said pointer to align said tool with respect to one of said plurality of flow holes.

21. The remotely controlled apparatus as claimed in claim 20, wherein there is included encoder means mounted on said [tool carriage] *support table* and coupled to said tool for providing an output signal indicative of the relative position of said tool with respect to said indicator means.

22. The remotely controlled apparatus as claimed in claim 20, wherein there is included first encoder means mounted on said [tool carriage] *support table* and coupled to said [support table] *tool carriage* for providing an output signal indicative of the relative position of said support table with respect to said indicator means, and second encoder means mounted on said support table and coupled to said tool for providing an output signal indicative of the movement imparted to said tool by said third drive means along said second dimension.

* * * * *